March 30, 1943.   S. H. HUNT   2,315,427
BASKET MANUFACTURE
Filed Jan. 19, 1940   6 Sheets-Sheet 1

INVENTOR.
Sylvester H. Hunt
BY
ATTORNEYS.

March 30, 1943. S. H. HUNT 2,315,427
BASKET MANUFACTURE
Filed Jan. 19, 1940 6 Sheets-Sheet 4

INVENTOR.
Sylvester H. Hunt
BY
ATTORNEYS.

March 30, 1943.　　　S. H. HUNT　　　2,315,427
BASKET MANUFACTURE
Filed Jan. 19, 1940　　　6 Sheets-Sheet 6

INVENTOR.
Sylvester H. Hunt
BY Lancaster, Allwine and Rommel
ATTORNEYS.

Patented Mar. 30, 1943

2,315,427

UNITED STATES PATENT OFFICE 2,315,427

BASKET MANUFACTURE

Sylvester H. Hunt, New Port Richey, Fla., assignor to Farmers Incorporated, Norfolk, Va., a corporation of Virginia Application January 19, 1940, Serial No. 314,702

27 Claims. (Cl. 1—13.6)

The present invention relates to the art of basket manufacture and the primary object of the invention is to provide improved apparatus for facilitating the manufacture of baskets composed of staved annular walls having hoops stapled or stitched to the staves.

A further object of the invention is to provide improved basket making apparatus whereby increased production and better quality baskets may be had at a minimum cost.

A further object of the invention is to effect a means and method of producing a hamper basket which avoids the necessity of previously forming hoops, composite bottoms and basket shells, or any after finishing of the basket by lap stitching hoops, placing or stitching in bottoms, with a consequent saving in labor and the necessary use of a number of separate machines as now required by present day methods.

A further object resides in the method of basket manufacture wherein the various elements of the basket structure are assembled in proper relation and then made into a completely finished basket by a series of successive strokes of a stapling machine.

A further object resides in the provision of basket manufacturing apparatus embodying an automatic stave feeding and positioning device in combination with a bottom assembling and placing device and a duplicate hoop stock feeding device, associated with and operable in proper sequence with a standard basket making machine.

A further object resides in the novel arrangement of the separately operable bottom assembling and placing means whereby the bottom structures are alternately presented one at a time to the stapling mechanism and the operator permitted to assemble one bottom structure while the basket is undergoing the stapling operation.

A still further object resides in the novel hoop feeding device whereby while one set of hoops is being stapled on one basket, the hoop stock for the next basket to be formed may be placed in position ready for movement simultaneously into proper stapling position.

Other objects and advantages of the invention will be apparent from the following detailed description, taken in connection with the accompanying drawings, forming a part of this specification and in which drawings:

Figure 6 is a projected view partly broken away and showing the latch releasing and stopping means for the basket machine.

Figure 7 is a plan view of one of the bottom assembling discs or heads and showing the manner of positioning the liner or inner bottom hoop upon the head.

Figure 7—A is a fragmentary detail view showing the manner of positioning the liner or inner top hoop upon the rotary form of the stapling machine.

Figure 8 is an enlarged perspective view of one of the hoop holding clips.

Figures 9 and 10 are enlarged fragmentary sections on the respective lines in Figure 7.

Figure 11 is an enlarged detail section taken longitudinally thru one of the hoop feeding guides.

Figure 12 is a section thru one of the ratchet feeding wheels of the hoop feeders.

Figures 1, 2:
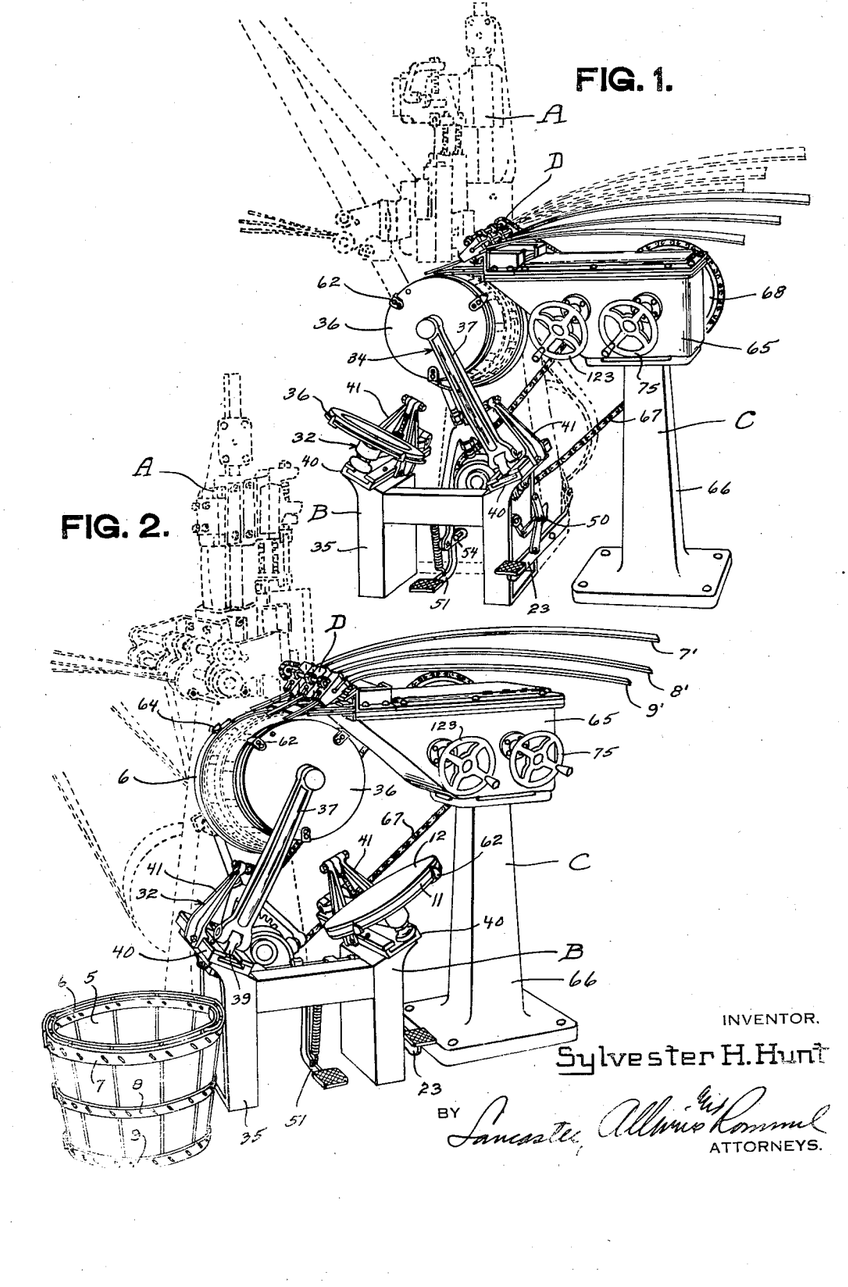
Figure 1 is a perspective view of the apparatus shown associated with a stapling machine, the stapling machine being shown in outline only.
Figure 2 is a perspective view looking at a different angle from that shown in Figure 1 and showing a completed basket such as may be formed with the apparatus.

While the apparatus forming the subject matter of this invention is not limited to use with the particular form of stapling machine disclosed, nor the manufacture of an open staved basket having a raised bottom such as disclosed in Figure 2, in the apparatus illustrated a construction is shown for formation of a basket such as disclosed in Figure 2. As shown in Figure 2, the basket comprises an annular wall composed of staves 5 to which are stapled inner and outer top hoops 6 and 7 respectively, an intermediate hoop 8 and an outer bottom hoop 9. As shown particularly in Figures 7, 9 and 10, the basket bottom comprises a double liner including inner bottom hoops 10 and 11 forming a support for a bottom panel or disc 12. These hoops, staves and bottom panel are secured together in a single stapling operation.

Referring to the drawings in detail, and wherein like reference characters designate corresponding parts thruout the several views, the letter A designates a basket stapling or stitching machine of general construction having operatively associated therewith the apparatus of this invention embodying a bottom assembling and placing device B and an automatic stave feeder and positioning device C, the latter having associated therewith a hoop feeding and guiding device D for holding and guiding the outer hoops 7, 8 and 9 into proper stapling relation to the staves 5.

The stapling machine A may be of the type such as disclosed in United States Patent Numbers 1,643,287 and 1,682,769, such stapling machines being designed to drive three staples simultaneously. The machine A comprises a pedestal 13 in the lower portion of which is journaled horizontally a main or drive shaft 14 on which is loosely mounted a pulley 15 over which a suitable belt is trained for imparting power to the machine. Mounted upon the upper end of the pedestal 13 is a stationary head 16 above which is reciprocally guided the stapler head 17 carrying the three staplers 18. Reciprocally guided in the pedestal 13 is a vertically disposed rod 19 to which the stapler head 17 is rigidly affixed. The shaft 14 is provided with a crank 20, and a link 21 connects this crank with the rod 19 for reciprocating the head 17. A clutch 22 controls transmission of power from the pulley 15 to the shaft 14 and this clutch is controlled by a foot lever 23 pivoted intermediate its ends as at 24. When the forward end of the lever 23 is pressed downwardly, the clutch 22 is engaged for transmitting power to the shaft 14 and reciprocating the head 17 for performing the stapling operations. The staplers 18 are provided with suitable wire feeding devices operable by the cam 25 and the rod 26. Rotatively supported in the pedestal 13 to extend beneath the stationary head 16, is a basket form comprising three anvil discs 27, 28 and 29 which progressively increase in diameter in the order given and with the larger disc 29 disposed adjacent the pedestal 13. This basket form is of frusto-conical formation and inwardly of the disc 29 is provided with a ratchet 30 with which a dog, not shown, engages for imparting intermittent rotary motion to the form. The shaft 14 may be provided with an eccentric 31 for rotating the basket form. As will be understood, the discs 27, 28 and 29 are intended to align one beneath each of the staplers 18. In the form of basket illustrated in Figure 2, the stapling machine is designed to drive two staples to each stave so that for a twelve stave basket, the basket form will be advanced twenty-four steps for each complete revolution of the form. On the down stroke of the stapler head 17 the basket form is stopped in its rotation to receive the staples, and on the up stroke of the head 17, the basket form is rotated by the ratchet mechanism.

Referring now to the bottom assembling and placing device B, the same is adapted to be so associated with the stapling machine A as to present assembled bottom structures in cooperative relation to the rotary basket form. This means B broadly comprises a pair of duplicate bottom placing devices 32 and 34 which are independently movable so as to be alternately presented to the rotary basket form. The means B comprises a frame 35 of suitable construction and mounted below the basket form for supporting the devices 32 and 34 in proper relation to the basket form.

Figure 5:
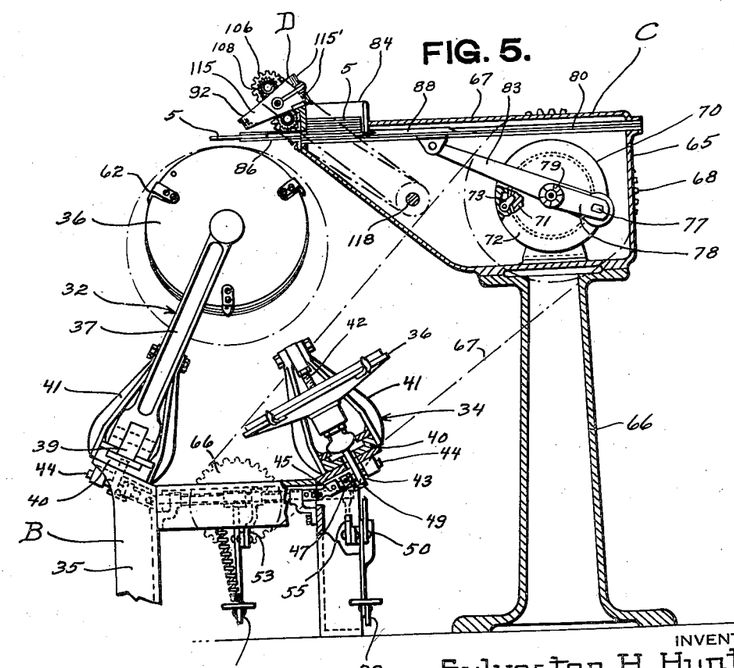
Figure 5 is a view part in section and part in elevation and showing the relation of the bottom assembling and placing device to the stave feeder.
Figures 6, 7, 7A, 8, 9, 10, 11, 12:
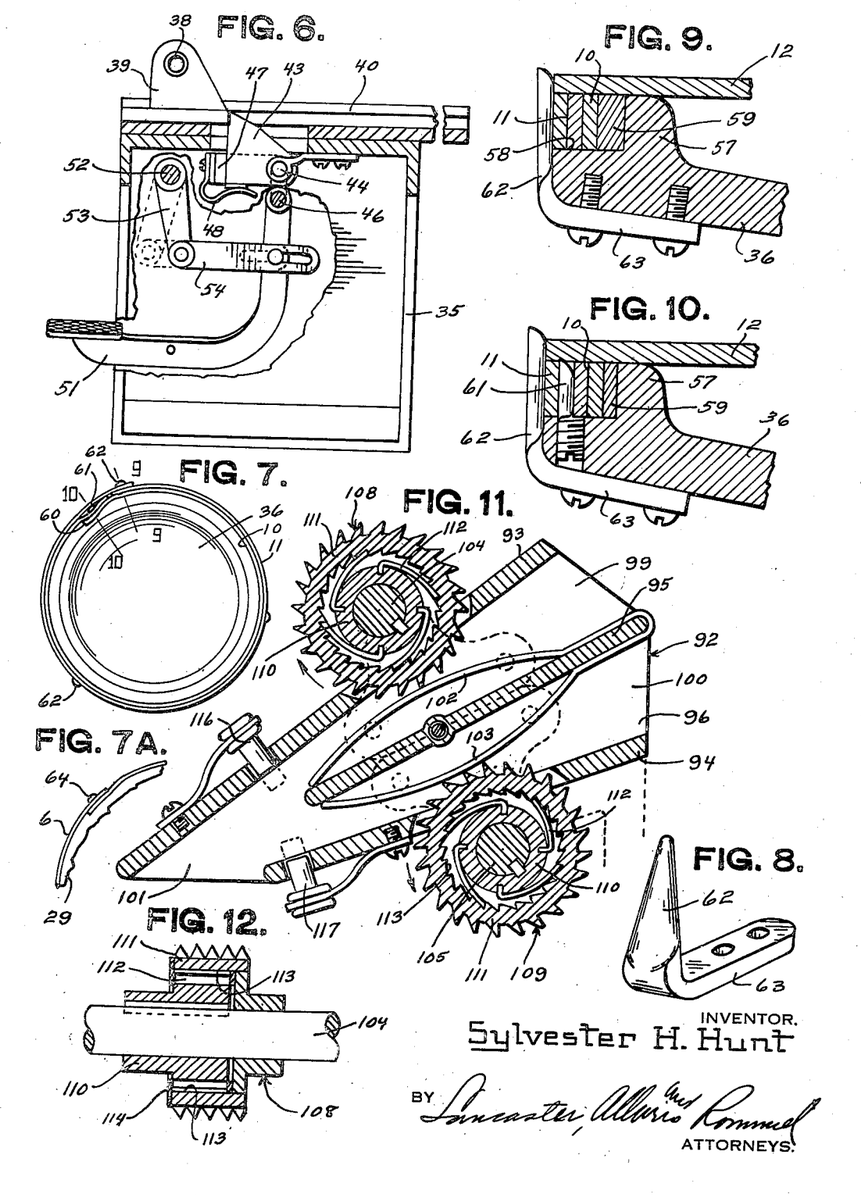
Figure 13:
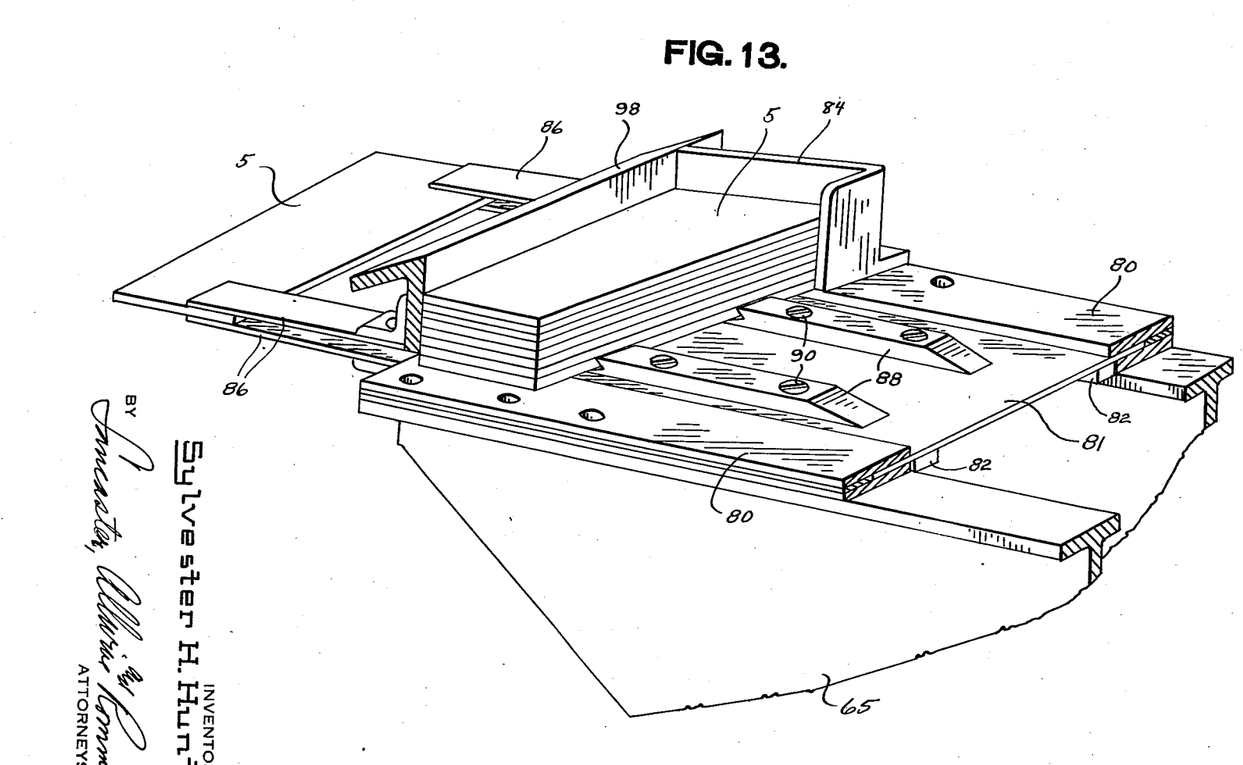
Figure 13 is an enlarged perspective view partly broken away and showing the manner in which the staves are fed and positioned for stapling.

The bottom assembling and placing devices 32 and 34 are of like construction and each consists of a bottom assembling disc or head 36 rotatably mounted upon a pin fixed to the outer end of a strut 37. The inner end of the strut is pivoted as at 38 to a slide block or shoe 39 slidable along guideways 40 supported upon the frame 35. Extending upwardly from the intermediate portion of each guideway 40 is a stand 41 to which one end of a radius rod 42 is pivoted. The opposite end of the rod 42 is pivotally connected to the intermediate portion of the strut 37, whereby the strut is caused to recede and lay substantially parallel with the guideway as the strut is lowered and the shoe 39 slides inwardly along the guideway. As shown particularly in Figure 3, when the bottom placing devices are lowered, the disc or head 36 is disposed relatively close to the frame 35 and does not project into the way of the operator. As shown in Figure 5, the guideways 40 are disposed in angular relation to one another whereby in the raised position of either bottom placing device 32 or 34, the center of the rotatable disc 36 will align co-axially with the axis of the basket form. Associated with each of the guideways 40 is a pivoted latch 43 with which the sliding shoes 39 engage when the bottom placing devices are in a raised position for holding these devices in this raised position with the basket bottom held against the disc 27 for rotation with the basket form. A detail of one of the latches 43 is shown in Figure 6, wherein the latch is shown engaging the sliding shoe 39 for holding its strut in a basket forming position.

These pivoted latches 43 are freely pivoted upon inclined shafts 44 suitably journaled beneath the guideways 40 and connected by universal joints 45 to opposite ends of a control shaft 46 suitably journaled in the frame 35. Rotation of the control shaft 46 in a manner to be later described operates to release both latches 43 at one time so as to release either one of the bottom placing devices 32 or 34 which may be in operative relation to the basket form. The releasing means for each latch 43 are alike and each includes a latch arm 47 fixed at one end upon the inclined shaft 44 and carrying at its free end a spring 48 acting to normally hold the latch raised as in Figure 6. Welded or otherwise secured to the latch 43 is a lug 49 which extends under the arm and acts as a stop to limit upward swinging of the latch by the spring 48. As shown in Figure 6, the sliding shoe 39 is free to ride past the latch and depress the latch on the outward travel of the shoe during raising of the bottom assembling head 36. Thus, when the shaft 46 in Figure 6 is turned counter-clockwise, both latches 43 will be released thus releasing the particular bottom placing device which may be in the upstanding position.

Thus it will be seen that the specific manner of mounting the duplicate bottom placing devices 32 and 34 so as to be alternately positioned at the rotary basket form, allows for the bottom assembling head or form 36 to lower away from the basket form and to recede in a manner to provide more working room in front of the machine and dispose the form at a more accessible position for placing hoops and bottoms thereon.

Figure 3:
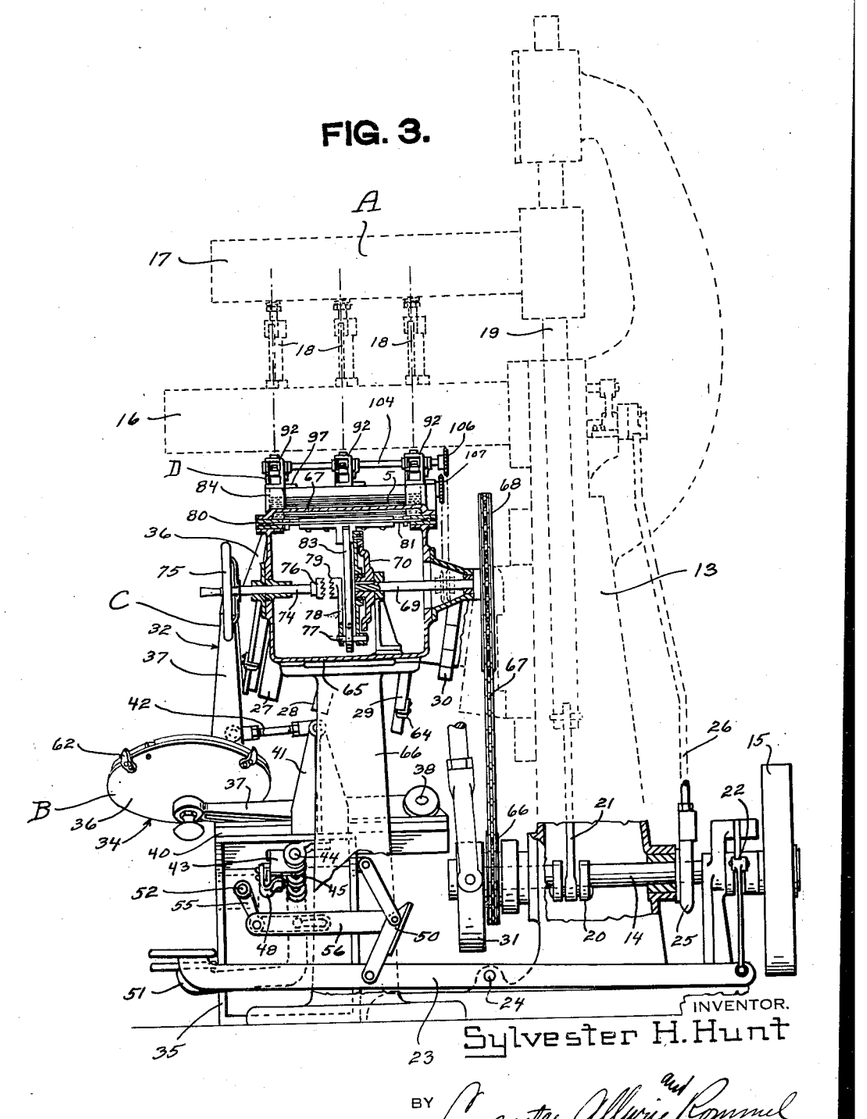
Figure 3 is a view part in section and part in elevation and showing the drive for the stave feeding means and the control means for starting the machine.
Figure 4:
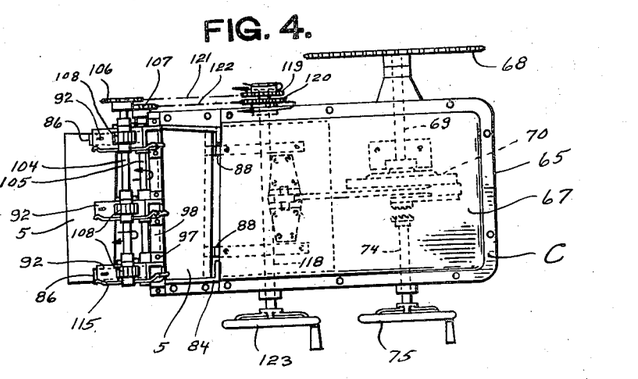
Figure 4 is a top plan view of the stave feeder.

The foot lever or treadle 23 for controlling operation of the stapling machine embodies means whereby upon depressing the lever, the machine will continue in operation until stopped after the complete basket has been formed by the stapling machine, and stopped by the operator. This means embodies a toggle joint 50 having one arm pivoted to the treadle 23 and its other arm pivoted upon the frame 35 whereby upon depressing the treadle, the arms of the toggle will move into longitudinal alignment and retain the treadle depressed with power applied to the stapling machine. After the stapling operation has been completed, the operator depresses a throw-off lever or treadle 51 which acts to simultaneously release the latches 43 and "kick out" the toggle 50, thus releasing the clutch 22 and stopping the machine. The throw-off or stopping lever or treadle 51 is rigid on the control shaft 46 and rocks this shaft for releasing the latches 43 when the treadle is depressed. Journaled on the frame 35 is a shaft 52 provided with a lever 53 which is connected by a link 54 with the treadle 51 as shown in Figure 6. Also on this shaft 52 is a second lever 55 which as shown in Figure 3, is connected by a link 56 to the toggle 50. Thus, the treadle 23 serves to start and continue the stapling machine in operation, while the treadle 51 serves to stop the machine thru releasing the treadle 23 and at the same time releasing the latches for the bottom forms 32 and 34 so that the completed basket may be removed from the basket form.

Referring now to the bottom assembling disc or head 36 of the bottom placing devices, while these heads have been designed in the example illustrated for assembling thereon a basket bottom structure embodying a double liner or inner bottom hoops and a thin solid bottom panel placed on this double liner for stapling to the basket, it will readily be apparent that the bottom placing device is capable of using various kinds of bottoms such as used in the type of basket as made by the stave feeder apparatus C. Referring particularly to the construction of the head 36 and the manner of assembling the inner bottom hoops 10 and 11 and the bottom panel 12 on the head, the head is formed with an annular flange 57 adjacent its peripheral edge providing an annular seat 58. Encircling the flange 57 is an anvil ring 59 provided in its circumferential face with a notch 60 forming a shoulder facing in one direction circumferentially of the ring. Projecting upwardly thru the annular seat 58 in radial alignment with the notch 60 is a retaining pin 61 having its upper end terminating on a line with the upper edge of the annular flange 57. Spaced at equi-distant points about the periphery of the head 36 are pins or clips 62 having attaching portions 63. These clips 62 project upwardly about the annular seat 58 to a height slightly above the annular flange 57 as clearly shown in Figures 9 and 10. One of these clips 62 as shown in Figure 7 is disposed in slightly circumferentially offset relation to the retaining pin 61. The ring 59, pin 61 and clips 62 permit assembling and retaining of a two part liner hoop, in combination with a bottom panel 12 upon the head 36 for positioning in assembled relation at the rotary basket former.

The depth of the anvil ring 59 is equal to the depth of the hoops 10 and 11 and in assembling the hoop stock upon the head 36, and with the head in its lowered position, one end of the hoop 10 is placed in the notch 60 and wrapped around the ring 59 with its opposite end engaging behind the pin 61 so that the ends overlap as shown in Figure 7. The hoop stock for the hoop 11 is then wrapped around the hoop 10 with one end abutting the hoop 10 and its other end engaging behind the clip 62 as in Figure 7. With the hoops 10 and 11 thus held by the pin 61 and clip 62, the bottom panel or disc 12 is placed over the hoops and centered thereover by the three clips 62 disposed about the edge of the bottom head. The clip 62 will hold the bottom so formed in place until the same is swung up to its stapling position at the end of the basket form on the stapling machine.

The inner or larger basket form disc 29 as shown in Figures 3 and 7—A, is provided with a clip 64 for holding the liner or inner top hoop 6 so that this hoop 6, as well as the hoops 10 and 11, may all be stapled into the basket with one stapling operation. The hoop stock for forming the inner top hoop 6 is wrapped about the disc 29 and the lapped ends inserted under the clip 64.

Referring now to the automatic stave feeding and positioning device C, the same is adapted to be associated with the standard stapling machine A and operated by a power take-off from the stapling machine and operated in timed relation to the machine in a manner so as to place a stave in the correct position on the rotary former to be stitched, at every second stroke of the stapling machine. The device C comprises a housing 65 mounted upon a stand 66 and disposed in proper relation to the rotary basket form of the stapling machine. The housing 65 is provided with a suitable cover 67, and as shown in Figure 5, the lower wall inclines upwardly toward the front or delivery end of the housing so as to clear the rotary basket form. The power take-off means for operating the feeder is such as to feed one stave for every two staples driven and this requires a two to one reduction in gearing between the shaft 14 and the stave feeder.

Keyed to the main shaft 14 is a sprocket 66 over which is trained a chain 67 which in turn is trained over a larger sprocket 68 keyed to a shaft 69 journaled in the housing 65. Carried by the inner end of this shaft 69 is a two-part crank disc 70 embodying an inner disc portion 71 keyed to the shaft 69 and an outer disc portion 72 having relative rotation with respect to the inner disc portion 71. As shown particularly in Figure 15, the disc portion 72 is provided with a pawl 73 engaging in a notch in the disc portion 71 providing a connection between the portions 71 and 72 permitting rotation of the disc portion 72 in one direction irrespective of the direct drive coupling between the disc portion 71 and the main shaft 14 of the stapling machine. Journaled in the housing 65 in axial alignment with the shaft 69, and capable of being shifted axially, is a clutch shaft 74 provided at its outer end with a hand wheel 75 and at its inner end with a jaw clutch 76. Keyed to the outer disc portion 72 is a crank pin 77 upon which is rigidly fixed a crank arm 78 which extends toward the axis of the crank disc 70 as shown in Figure 5 and is provided at its free end with a clutch member 79 to be engaged by the clutch member 76, whereby the crank disc portion 72 may be rotated in one direction by the hand wheel 75. This two-part crank disc 70 together with the clutch means 77 and 79 is to permit one of the staves to be manually advanced to a stapling position by turning the hand wheel 75 so as to condition the apparatus for the initial stapling operation.

Reciprocally guided at its side edges in suitable guides 80 mounted upon the forward end of the frame or housing 65 is a plate cross head 81 provided at its under side with stops 82 extending the full length of the plate and rubbing against the guides 80 for retaining the reciprocatory motion of the sliding crosshead to alignment. A connecting rod 83 connects the crank pin 77 with the crosshead 81 whereby a reciprocatory movement is imparted to the crosshead upon rotation of the crank disc 76.

Figures 14, 15, 16:
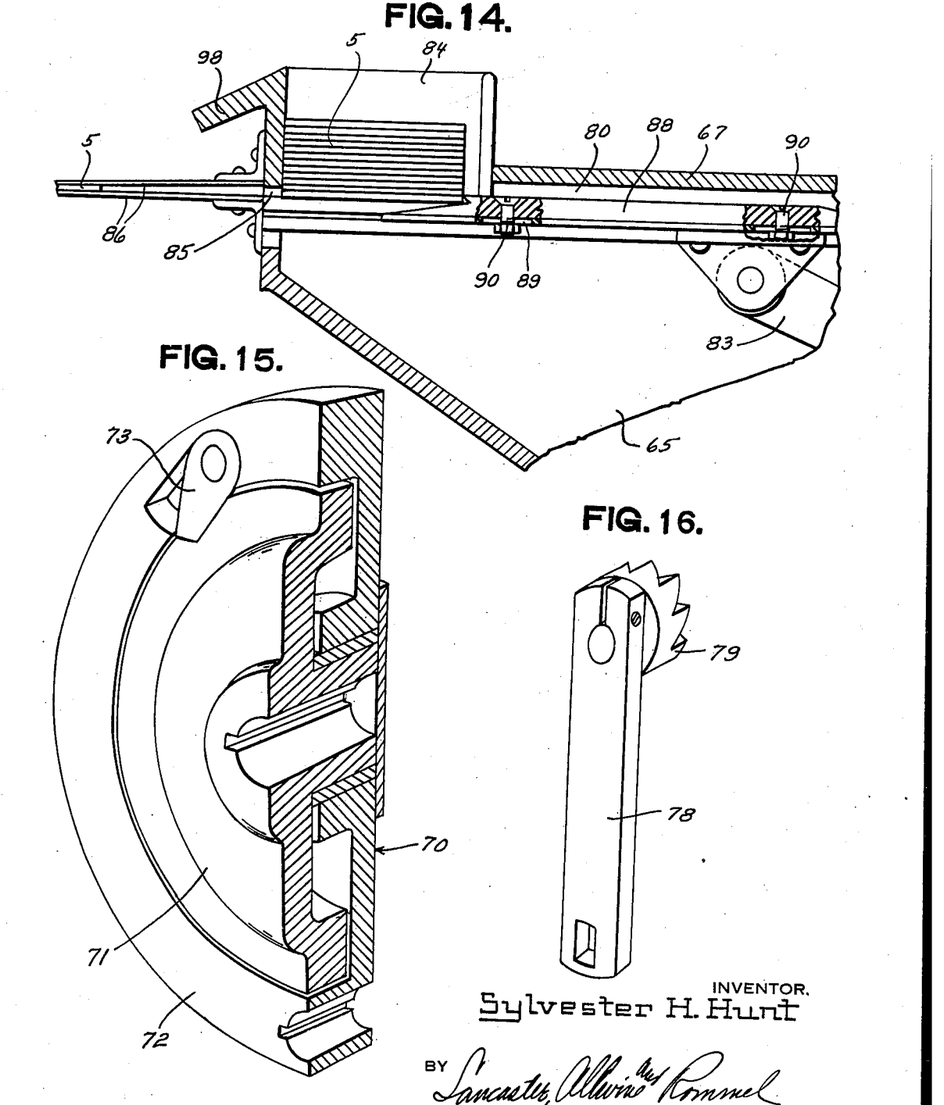
Figure 14 is an enlarged fragmentary vertical section thru the forward portion of the stave feeder.
Figure 15 is a sectional perspective view of the two part crank disc of the stave feeder.
Figure 16 is a perspective view of the crank arm associated with the crank disc to permit manual conditioning of the stave feeder for the initial stapling operation.

Mounted upon the forward end of the housing 65 so as to have the crosshead plate 81 reciprocable therebeneath, is a stave magazine or hopper 84 in which the basket staves are placed so as to be fed one at a time to the stapling machine. The front wall of the magazine 84 has an opening 85 in its lower portion which extends entirely across the full length of the magazine and is of a height slightly less than the thickness of two staves. The purpose of this opening is to hold back the stave above the bottom one when the bottom stave is being advanced. Projecting forwardly from each end of the magazine 84 are pairs of spring leaves 86 between which the end portions of the staves are yieldably held when advanced into proper stapling position at the end of the ejecting stroke of the crosshead 81. As shown in Figure 14, the springs 86 are held spaced apart at their points of connection with the magazine 84 to permit passage of the staves between the springs. Adjustably mounted upon the upper side of the crosshead plate 81 are two stave engaging lugs 88. The plate crosshead is provided with slots 89 receiving bolts 90 whereby the lugs 88 are independently adjustable longitudinally so that their stave engaging ends may be adjusted to contact a stave at the same instant. The front or stave engaging ends of these lugs 88 are shaped to peculiarly meet the position of contact between stave and lug in that their end face recedes from the top of the lug in a manner as to offer an edge to the stave and to a depth corresponding to the stave thickness, thence the face of the lug inclines forward and downward to the edge of the plate 81 as shown in Figure 14. This form of lug pushes the down extending edge of a dry stave up to the top of the incline to engage properly with the face or notch in the lug, which then displaces the bottom stave in the magazine and places it in the proper stapling position at the end of the cross head stroke and between the springs 86.

As will be observed, the crank pin and disc arrangement causes the plate cross head to move forward and backward in a simple harmonic motion and which is extremely desirable inasmuch as the motion of placing a stave accelerates toward the center of the stroke and de-accelerates at the end of the stroke. Since the movement of the stave de-accelerates when approaching the end of its projected movement between the springs 86, displacement of the stave due to any inertia of its forward movement is prevented and the stave is held in proper position to be stapled.

Referring now to the hoop feeding and guiding means D, this means is associated with the stave feeding means C and provides an arrangement whereby advantage of the time during which one set of three hoops is being stapled on the basket, to place the necessary three hoops in position for the next basket and at the proper time to place these three hoop strips or stock in proper stapling relation simultaneously. This duplicate hoop strip feeding means comprises three hoop strip holders and guides 92 mounted in spaced relation along the stave magazine 84 whereby the hoop strips for formation of the outer hoops 7, 8 and 9 may be fed to their respective positions beneath the three staplers 18.

The strip holders 92 are of like construction and each consists of a forwardly tapering holder having a top wall 93, a bottom wall 94 and an intermediate or partition wall 95 integral along one edge with a vertical side wall 96 whereby the holder is open along one side. The side wall 96 is provided with suitable flanges 97 whereby the strip holders may be rigidly secured to the inclined flange 98 formed along the upper edge of the front wall of the stave magazine 84. As shown particularly in Figure 11, the partition wall 95 divides the holder into upper and lower compartments 99 and 100 respectively, which taper toward the forward end of the holder and open into a single delivery opening or passageway 101 at the forward end of the holder. The rear end of the partition wall 95 projects rearwardly past the rear edges of the top and bottom walls 93 and 94. Positioned over the partition wall 95 is a spring member provided with bowed portions 102 and 103 arranged respectively in the compartments or passageways 99 and 100.

Journaled to extend horizontally across the upper sides of the strip holders 92 is an upper feed shaft 104, while suitably journaled to extend horizontally across the under side of the strip holders is a lower feed shaft 105 and these feed shafts are respectively provided at one end with sprockets 106 and 107. Mounted upon the upper feed shaft 104, one for each of the strip holders 92, is a clutch-feed wheel 108, while mounted upon the lower feed shaft 105, one for each of the strip holders is a clutch-feed wheel 109. The top walls 93 of the strip holders are provided with openings thru which the upper clutch-feed wheels 108 project into cooperative relation with the bowed spring 102, while the lower strip holder walls 94 are provided with openings thru which the lower clutch-feed means 109 project into cooperative relation with the bowed springs 103.

These clutch-feed wheels 108 and 109 are all of like construction but are disposed in reversed relation upon their respective feed shafts so that the wheels act to feed the hoop strips forwardly thru the holder upon the proper direction of rotation of their feed shafts. As shown in Figure 11, rotation of the upper feed shaft 104 in a clockwise direction will move a hoop strip forwardly in the compartment 99, while rotation of the lower feed shaft 105 in a counter-clockwise direction will feed a hoop strip forwardly in the lower compartment 100. Each clutch-feed wheel comprises a hub portion 110 which is keyed to the feed shaft and an externally toothed feed ring 111 rotatable on the feed shaft and encircling one end of the hub portion 110. Secured at one end about the hub portion 110 is a series of spring pawls 112, the free ends of which engage with ratchet teeth 113 provided on the inner face of the toothed feed ring 111. Suitable retaining rings 114 retain the pawls 112 in proper position. Thus it will be seen that when the feed shafts 104 and 105 are rotated in one direction, the feed rings 111 will idle on the shafts and when the shafts are rotated in an opposite direction, the spring pawls 112 will engage the ratchet teeth and impart rotation to the feed rings.

Disposed over the open side of each strip holder 92 is a plate spring 115 which is split or divided at its upper or rear portion as shown in Figure 5, providing spring portions 115' adapted to project slightly into the holder compartments 99 and 100. These plate springs 115 serve to hold the hoop strips in alignment against the vertical wall 96 of the holders as the strips feed thru the holders.

Mounted upon the forward portion of the top wall 93 of each strip holder so as to be projected into the path of a strip inserted in the upper compartment 99, is a spring retracted stop or gauge pin 116. Likewise mounted in the bottom wall 94 of each strip holder is a spring retracted stop or gauge pin 117. These stop or gauge pins 116 and 117 are disposed forwardly of their respective clutch-feed wheels 108 and 109. The upper gauge pin 116 when depressed limits insertion of a hoop strip into the upper compartment 99, while the lower gauge pin 117 when depressed serves to limit insertion of a hoop strip in the lower compartment 100.

Journaled in the housing 65 is a shaft 118 upon one end of which are feed sprockets 119 and 120 which are respectively connected by sprocket chains 121 and 122 with the sprockets 106 and 107. Mounted upon the opposite end of the shaft 118 is a hand wheel 123 which may be manually operated for imparting rotation to the hoop feeding shafts 104 and 105.

Since only one set of three outside hoops are to be fed and stapled at one time, the operation of the hoop feeding means alternates so that while one set of hoop strips is moving thru, say the upper compartment 99, a second set of three hoop strips is inserted between the tooth feed wheels 109 and the bowed spring 103 and push forward until they strike the stop pins 117 which are depressed by the operator with one hand while he feeds the hoop strip into the holders with the other hand. Since there are three holders for the hoop strips, the placing of the hoop strips in the holders are alternated, one set of hoop strips being inserted in the passageway 99 and the next in the passageway 100 into engagement with their respective gauge pins before the strips are fed thru rotation of the hand wheel 123 into stapling position on the basket form as shown in Figures 1 and 2. When the hoop strips are fed into the holders, the bowed springs 102 and 103 exert pressure upon the strips so that the teeth on the feed rings 111 bite into the strips whereby upon rotation of the feed wheel, the strip is moved forward to its proper stapling position and this position is determined by one revolution of the hand wheel 123. The hand wheel 123 when turned thru one revolution clockwise will, thru the sprocket 119, chain 121 and sprocket 106 rotate the upper feed shaft 104 and the upper clutch-feed wheels 108 in a clockwise direction and propel the hoop strips in the upper compartment 99 of the holders 92 forward to their stapling position. The hand wheel 123 when turned thru one revolution counter-clockwise will, thru the sprocket 120, chain 122 and sprocket 107, rotate the lower feed shaft 105 and the clutch-feed wheels 109 in a counter-clockwise direction and propel the hoop strips in the lower holder compartment 100 forward to their stapling position.

With the upper and lower clutch-feed wheels 108 and 109 respectively having a free wheeling action, the upper wheels 108 in one direction and the lower wheels 109 in the opposite direction, this manner of rotation satisfies the condition that when the three hoop strips are stitched or stapled to the basket, the hoop strips pay off at different speeds due to the different diameters of the basket at the points where the strips are stapled to the basket. After the hoop strips are attached to the first stave by the first staples, rotation of the basket form will draw the strips thru the holders during the successive stapling operations until the strips are entirely wound around the basket and stapled to the staves. The clutch-feed wheels 108 and 109 will allow for the hoop strips being drawn thru the holders without imparting any rotation to their respective feed shafts.

Referring now to the method of using the apparatus in association with a conventional basket stapling machine, the apparatus is such as to permit the assembling and forming of the basket elements into a finished basket by a series of successive stapling cycles. The method of producing a hamper basket consists in first taking a hoop strip for formation of the inside top hoop strip and bending the strip around the basket form disc 29 and inserting the lapped ends beneath the clip 64 which temporarily holds the strip in hoop form, and without the use of staples, adhesives, etc. On one of the bottom forms 36 are then wrapped upon the annular seat 58 two hoop strips which are overlapped at their ends and held in hoop form by the pin 61 and clip 62 for providing the double liner or inner bottom hoops 10 and 11. The bottom panel or disc 12 is then placed over the inner bottom hoop and held in position by the clips 62 so that the bottom form 36 may be swung up to its stapling position at the end of the rotary basket form. The bottom placing device upon which the basket bottom has been assembled is then swung upwardly against the rotary basket form and automatically held in this raised position by its latch 43. The necessary number of staves required to make a basket are then placed in the magazine 84. In the example illustrated, the basket has twelve staves so that at least twelve staves must be placed in the magazine 84. The hand wheel 75 is then shifted toward the housing 65 for engaging the clutch elements 76 and 79 and the hand wheel then rotated one revolution in a counter-clockwise direction for advancing the bottom stave in the magazine to its stapling position above the basket form and where the stave is held by the spring arms 86. This manual advancing of the first stave without affecting the stapling machine is made possible by the two-part crank disc 70.

The outside hoop strips 7', 8' and 9' as shown in Figures 1 and 2 for formation respectively of the outside hoops 7, 8 and 9 may then be inserted in the lower compartment 100 of their respective holders and insertion of the strips gauged by depressing the lower gauge pins 117. The hand wheel 123 is then turned one revolution in a counter-clockwise direction which imparts a like direction of rotation to the lower clutch-feed wheels 109 whereby the three outside hoop strips are simultaneously advanced to a proper stapling position, one beneath each of the staplers 18. The various elements of the basket structure are now in proper relation for the first stapling cycle of the basket machine and during the subsequent stapling cycles, the basket elements are automatically brought into proper relation whereby the basket will be completely finished.

The operator then depresses the treadle 23 which actuates the clutch 22 for imparting power to the shaft 14 and starting operation of the stapling machine. Rotation of the shaft 14 actuates the stave feeding means C in timed relation to the stapling cycles of the machine whereby one stave is advanced from the hopper for each two stapling cycles. When the treadle 23 is depressed, the toggle 50 holds the treadle depressed, so that the stapling machine continues running after the operator's foot is removed from the treadle.

While the machine is performing the stapling operation, the operator assembles another basket bottom upon the alternate lowered bottom form 36 as previously described and positions another set of hoop strips as shown by dotted lines in Figure 1 in the upper compartment 99 of the hoop strip holders 92 and gauges the insertion of these strips by the gauge pins 115. At this time, additional staves may also be placed in the magazine 84. After the stapling operation has been completed, the operator steps upon the treadle 51 which releases the toggle 50 allowing disengaging of the clutch 22 and at the same time releasing the latches 43 permitting the bottom placing device to be lowered and the finished basket removed from the rotary form.

With the finished basket removed from the form, the operator has merely to place a liner or inner top hoop 6 about the disc 29, swing the alternate bottom form up against the basket form, advance one of the staves by the hand wheel 75 and rotate the hand wheel 123 for one revolution in a clockwise direction for simultaneously advancing the three hoop strips previously placed in the upper holder compartment 99. The treadle 23 may then be depressed for starting the stapling machine and the assembling operations of the operator then repeated.

With the increased speed of the basket machine occasioned by automatic feeding of the staves and the time interval of the stapling operation which the operator uses to form the bottoms and positioning a set of outer hoops, results in the making of a basket in considerably less time than is possible in present practice, and due to the mechanical placing of the staves, the basket is more accurately constructed.

With the apparatus herein disclosed, when operatively related to a basket stapling machine of conventional construction, a method for the manufacture of baskets is provided wherein the various elements of the basket structure may be assembled, and formed or fashioned into a finished basket by a series of successive strokes of the stapling machine.

Thus it will be seen that improved apparatus for association with a conventional basket stapling machine has been disclosed whereby increased production and better quality baskets may be produced, and without requiring any after finishing of the basket.

Changes in details may be made to the form of invention herein shown and described, without departing from the spirit of the invention or the scope of the following claims.

I claim:

1. In basket making apparatus, a stapling machine including a rotary form and staplers above the form, bottom assembling means for presenting assembled bottom structures to the rotary form, a magazine for holding a plurality of staves, stave feeding means for successively delivering staves from the magazine to the rotary form, hoop holding means for guiding hoop strips over the staves beneath the staplers, and means for operating the stave feeding means in timed relation to the staplers.

2. In basket making apparatus, a stapling machine including a rotary form and staplers reciprocable above the form, drive means for rotating the form and operating the staplers with an intermittent motion, a bottom assembling head movable into basket forming relation with the outer end of the form, a magazine for holding a plurality of staves, stave feeding means operable from said drive means in timed relation to the staplers for successively feeding staves from the magazine to the form, and hoop strip holders for guiding hoop strips over the staves beneath the staplers.

3. In apparatus for making baskets, a stapling machine including an intermittently rotated form, duplicate bottom placing devices for alternately presenting assembled bottom structures to the form, a stave feeding and positioning means for successively delivering staves to the form in timed relation to movement of the form, and duplicate hoop strip holders for guiding alternate sets of hoop strips over the staves.

4. In basket making apparatus, the combination with a stapling machine including a rotary basket form, of bottom assembling and placing means comprising a pair of independently movable bottom forms adapted for alternately presenting assembled bottom structures in basket bottom forming relation to the basket form.

5. In basket making apparatus, the combination with a stapling machine including an intermittently rotated basket form, of a magazine for holding a plurality of staves and a stave feeder operatively driven from the stapling machine in timed relation to the intermittent motion of the basket form for successively feeding staves from the magazine into a stapling position on the basket form.

6. In basket making apparatus, the combination with a stapling machine including a rotary basket form, of outer hoop strip feeding means comprising a series of holders each having a pair of strip receiving passageways for alternate guiding of a series of hoop strips over the basket form.

7. In basket making apparatus, the combination with a stapling machine, of a rotary basket form, means for attaching an upper liner hoop strip to the inner end of the form, a pair of independent bottom assembling forms separately movable into position against the outer end of the basket form, stave feeding means for successively delivering staves to the basket form, and outer hoop strip holders adapted to receive sets of hoop strips for alternate feeding to the basket form.

8. In basket making apparatus, a stapling machine having a rotary basket form, a drive shaft for intermittently rotating the form, control means for the drive shaft, bottom assembling and placing means including separate bottom forms independently movable into cooperative relation to the basket form, retaining means for holding the bottom forms in co-operative relation to the basket form, stave feeding means directly driven from the drive shaft for successively feeding staves to the basket form in timed relation to movement of the basket form, outer hoop strip holders for feeding alternate sets of hoop strips to the basket form, and a single stop control for simultaneously throwing out said control means and releasing said retaining means.

9. In basket making apparatus, in combination with a multiple stapling machine including a rotary basket form; an automatic stave feeder comprising a stave magazine, means for singly projecting the staves from the magazine, and spring holding fingers for receiving the staves when projected, said fingers firmly holding the stave in a position above the basket form for receiving the first staples and allowing the stave to be drawn from the fingers by rotation of the basket form into position for receiving the second staples.

10. In basket making apparatus, in combination with a stapling machine; a stave feeder comprising a driven shaft having direct drive connection with the stapling machine, a two-part crank disc including an inner disc portion keyed to said shaft and an outer disc portion rotatable in one direction on the inner disc portion and having a crank pin, a stave magazine, a sliding cross head for singly projecting staves from the magazine, a connecting rod connecting the cross-head and said crank pin and means releasably engageable with the outer disc portion permitting manual operation of the crosshead.

11. In combination with a basket stapling machine including a rotatable basket form, means for feeding staves to the form comprising a housing, a stave magazine, stave holding fingers for yieldably gripping a stave projected from the magazine, an ejecting plate reciprocable below the magazine for ejecting staves one at a time from the magazine, a shaft journaled in the housing and directly driven from the stapling machine, a drive connection between the shaft and said ejecting plate, and manually operable means associated with the drive connection permitting actuation of the ejecting plate independent of rotation of said directly driven shaft.

12. An automatic stave feeder and positioning apparatus comprising a housing, a stave magazine mounted on the housing and having a stave ejecting opening, a plate crosshead reciprocable beneath the magazine, stave ejecting lugs mounted upon the upper side of the crosshead and adjustable in the direction of reciprocation of the crosshead, and spring fingers for receiving and releasably holding the staves when moved thru said opening by the ejecting lugs.

13. In an automatic stave feeder, a stave magazine, a plate crosshead reciprocable beneath the magazine, and elongated stave ejecting lugs mounted upon the upper surface of the crosshead and independently adjustable in the direction of reciprocation of the crosshead, said lugs having their stave engaging ends undercut from the top surface of the lugs for the depth of a stave and from the undercut inclined downwardly and forwardly to an edge at the bottom surface of the lugs.

14. In apparatus for making frusto-conical baskets, the combination of a rotatable basket form, and means for feeding hoop strips, and staves successively to the basket form comprising a stave magazine, ejecting means for ejecting staves one at a time from the magazine, spring fingers receiving the ejected staves for holding the staves in a staple receiving position on the basket form, and hoop strip holders mounted on the magazine for directing hoop strips over the staves.

15. In apparatus for making baskets, the combination of a rotatable form, and bottom assembling and placing means for the form comprising a pair of independently movable bottom placing devices each embodying a rotary bottom assembling head movable to a raised position against an end of the basket form, latch means for retaining each bottom placing device in a raised position, and a releasing means common to both latch means.

16. In combination with a basket making machine including a rotary basket form, bottom placing means comprising a frame, arranged beneath the form, a pair of guides on the frame, a shoe slidable in each guide, a strut pivoted at one end on each shoe, a stand intermediate the end of each guide, a radius rod connecting each stand with the intermediate portion of its respective strut, and a rotatable bottom form mounted on the other end of each strut, said bottom forms being independently movable into alignment with the rotary basket form.

17. In combination with a basket making machine including a rotary basket form, bottom assembling means including a pair of duplicate bottom placing devices each embodying a rotary bottom form for positioning against an end of the basket form, and supporting and guiding means for the bottom form for causing the bottom forms to lower away from the basket form and recede to a position closely adjacent to the basket form.

18. In combination with a basket making machine including a rotary basket form and drive means for the form, bottom assembling means including duplicate bottom placing devices independently movable into a raised operative position against the basket form, a separate latch for each bottom placing device when raised, and a single control means for releasing both of the latches and said drive means simultaneously.

19. In apparatus for making baskets, outside hoop strip feeding means comprising a frame having separate strip receiving passageways, a clutch-feed wheel associated with each passageway and operating with reverse action to one another, means for rotating the clutch-feed wheels, and gage means for gaging insertion of the hoop strips into the passageways.

20. In apparatus for making baskets, an outside hoop strip holder comprising a frame providing a strip receiving passageway, a spring retracted stop for gaging insertion of a hoop strip in the passageway, a ratchet-feed wheel projecting into the passageway and rotatable in one direction by the hoop strip, and means for rotating the feed wheel for moving the strip thru the holder.

21. In apparatus for making baskets, outside hoop strip feeding means comprising a series of spaced apart holders each having upper and lower strip passageways, an upper feed shaft extending across the upper side of the holders, a lower feed shaft extending across the lower side of the holders, upper clutch-feed wheels on the upper feed shaft embodying feed rings extending into said upper passageways, lower clutch-feed wheels on the lower feed shaft embodying feed rings extending into said lower passageways, gage means forwardly of the feed shafts for gaging insertion of the hoop strips in either passageway, and means for imparting rotation to the feed shafts.

22. In apparatus for making frusto-conical baskets, outside hoop strip feeding means comprising spaced apart holders, and ratchet-positioning means for each holder permitting the strips to feed thru their respective holders at different speeds in accordance with the diameter of the basket at the location where the strips are attached.

23. In an outside hoop strip feeding device, a holder having upper and lower strip passageways, an upper feed shaft above the holder, a lower feed shaft below the holder, upper and lower clutch-feed wheels on the respective feed shafts, said wheels each embodying a toothed feed ring projecting into the respective passageways of the holder and adapted for opposite directions of rotation with respect to one another, normally retracted gage means for each passageway for limiting insertion of the hoop strips in the passageways, and a hand wheel operatively connected for imparting rotation to both of the feed shafts simultaneously whereby the hoop strip in either passageway may be advanced thru the holder in accordance with the direction of rotation of the hand wheel.

24. Those steps in the method of making a basket which consist in looping strip material into hoop formation with its end portions in overlapping relation, temporarily holding the overlapping portions together, placing and temporarily holding a bottom panel in centered relation upon one edge of the strip material while in hoop formation, placing staves in overlapping relation with the external circumferential faces of the bottom panel and strip material while in hoop formation, securing the strip while in hoop formation and the bottom panel to the staves, and releasing the temporary hold on the overlapping portions of the strip material.

25. Those steps in the method of making a basket which consist in looping strip material into hoop formation with its end portions in overlapping relation, temporarily holding the overlapping portions together, placing staves in overlapping relation with the external circumferential face of said strip material while in hoop formation, securing said strip material while in hoop formation to the staves, and releasing the temporary hold on the overlapping portions of the strip material.

26. Those steps in the method of making a basket which consist in looping strip material into inner and outer hoop formation, with the end portions in overlapping relation, temporarily holding the overlapping portions together, placing and temporarily holding a bottom panel in centered relation upon one edge of the strip material while in hoop formation, placing staves in overlapping relation with the external circumferential faces of the bottom panel and the strip material while in hoop formation, securing the strip material while in hoop formation and the bottom panel to the staves, and releasing the temporary hold on the overlapping portions of the strip material.

27. The method of making a basket which consists in looping two strips of hoop material each into hoop formation with the end portions of each in overlapping relation, temporarily holding the overlapping portions together, placing and temporarily holding a bottom panel in centered relation upon one edge of one of the strips while in hoop formation, disposing said strips while in hoop formation in spaced apart concentric relation, with the bottom panel intermediate the two strips while in hoop formation, placing staves in overlapping relation with the external circumferential faces of said bottom panel and said strips while in hoop formation, securing said staves to the bottom panel and to said strips while in hoop formation, and releasing the temporary hold on the overlapping portions of the strip material.

SYLVESTER H. HUNT.